United States Patent [19]

Graham et al.

[11] Patent Number: 5,257,006

[45] Date of Patent: Oct. 26, 1993

[54] METHOD AND APPARATUS FOR POWER LINE COMMUNICATIONS

[75] Inventors: Martin H. Graham, Berkeley; Howard W. Johnson, Sunnyvale, both of Calif.

[73] Assignee: Echelon Corporation, Palo Alto, Calif.

[21] Appl. No.: 586,458

[22] Filed: Sep. 21, 1990

[51] Int. Cl.⁵ .......................................... H04M 11/04
[52] U.S. Cl. .............................. 340/310 A; 340/310 R; 340/310 CP
[58] Field of Search ......... 340/310 A, 310 R, 310 CP

[56] References Cited

U.S. PATENT DOCUMENTS

| | | | |
|---|---|---|---|
| 1,607,668 | 11/1926 | Fetter | 340/310 R |
| 1,672,940 | 6/1928 | Honaman | 340/310 R |
| 3,973,087 | 8/1976 | Fong | 340/310 R |
| 4,012,733 | 3/1977 | Whyte | 340/310 R |
| 4,142,178 | 2/1979 | Whyte et al. | 340/310 R |
| 4,188,619 | 2/1980 | Perkins | 340/310 R |
| 4,638,299 | 1/1987 | Campbell | 340/310 A |
| 4,903,006 | 2/1990 | Boomgaard | 340/310 A |
| 5,051,720 | 9/1991 | Kittirutsunetorn | 340/310 A |
| 5,148,144 | 9/1992 | Sutterlin et al. | 340/310 A |

FOREIGN PATENT DOCUMENTS

| | | |
|---|---|---|
| 1535834 | 1/1976 | United Kingdom . |
| 1592971 | 7/1977 | United Kingdom . |
| 2148643 | 3/1988 | United Kingdom . |
| 2198605 | 6/1988 | United Kingdom . |

OTHER PUBLICATIONS

Ivan Smith, "Networking on the Mains Wiring", *Communications International*, Dec. 1986, p. 43.

*Primary Examiner*—John K. Peng
*Assistant Examiner*—Edward Lefkowitz
*Attorney, Agent, or Firm*—Blakely, Sokoloff, Taylor & Zafman

[57] ABSTRACT

A method and apparatus for power line communications which utilizes common mode transmission and reception of communication signals over power lines. The communication signals are sent and received between the power and neutral lines, and the ground line. A common mode choke in the power lines presents a relatively high impedance to the communication signals and prevents them from being shorted to the ground line. The choke is substantially transparent to the power delivery current.

4 Claims, 4 Drawing Sheets

FIG_1 (PRIOR ART)
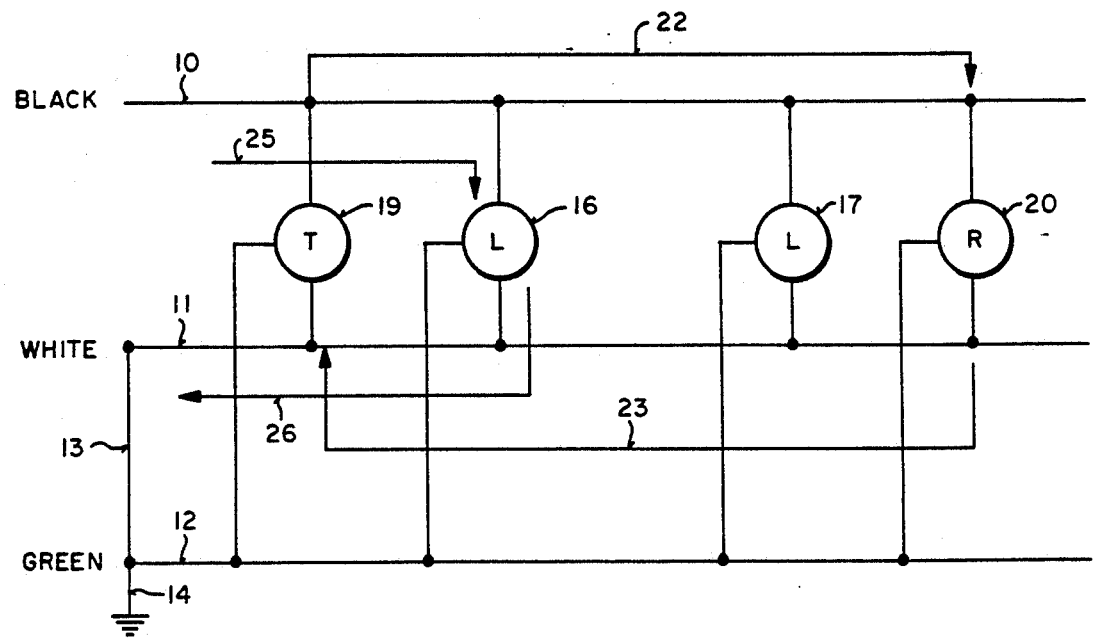
FIG_2
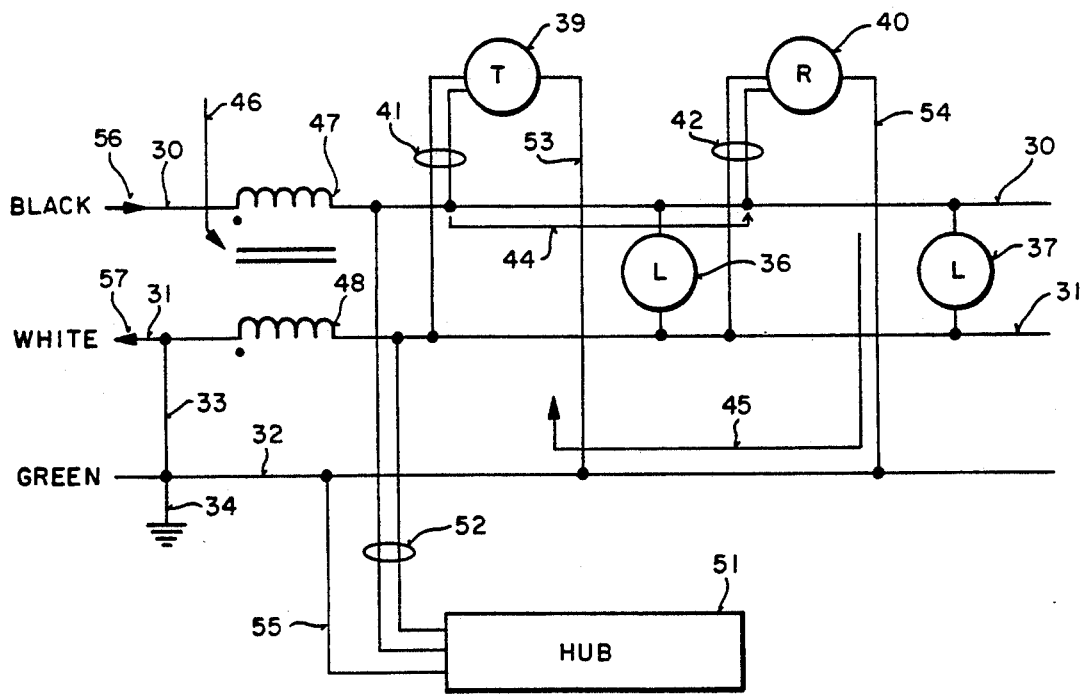

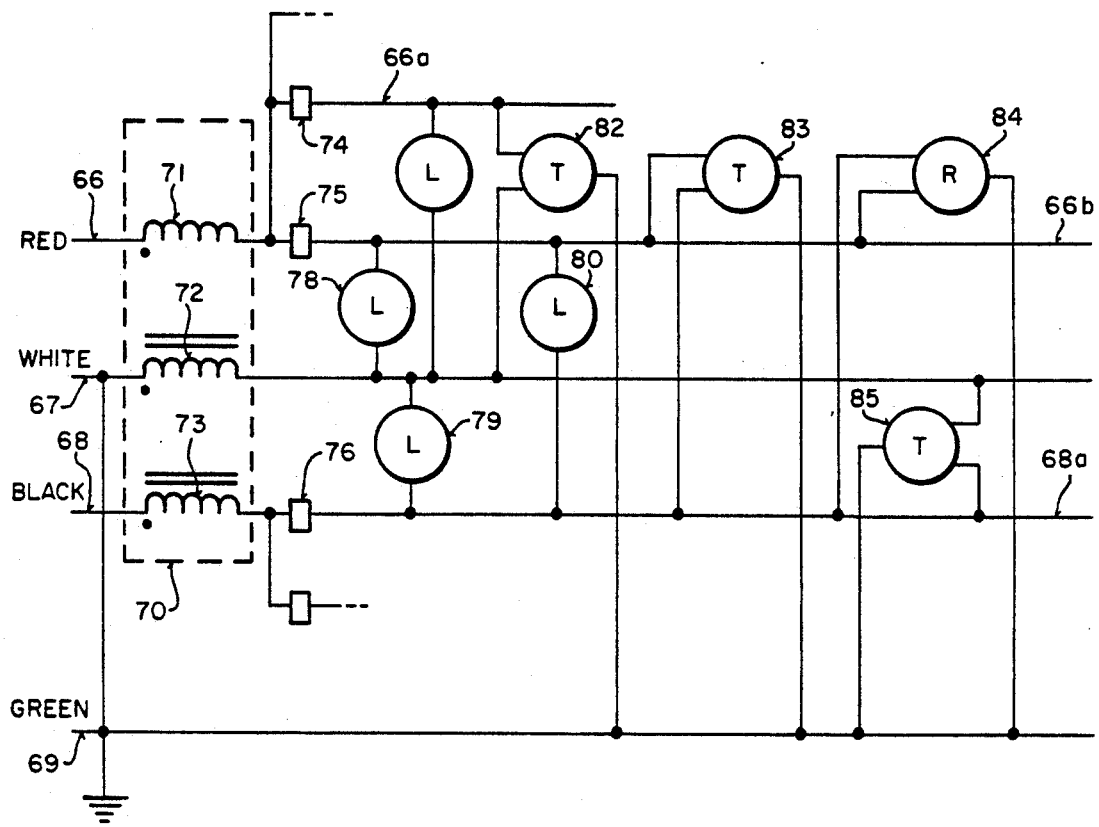
FIG_3
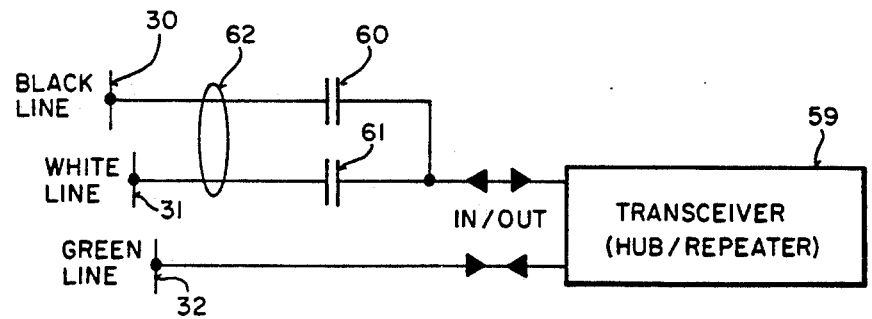
FIG_4

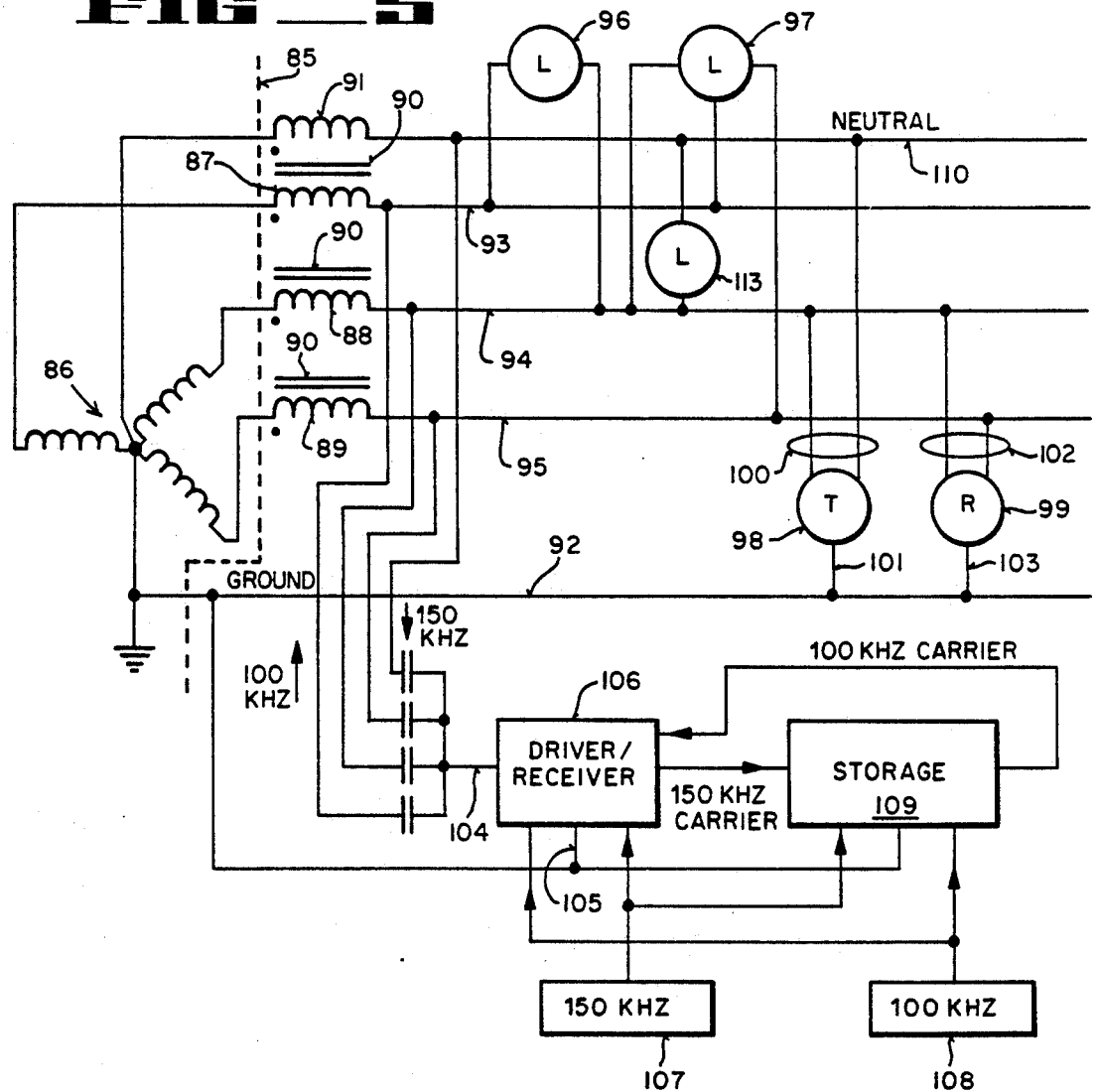
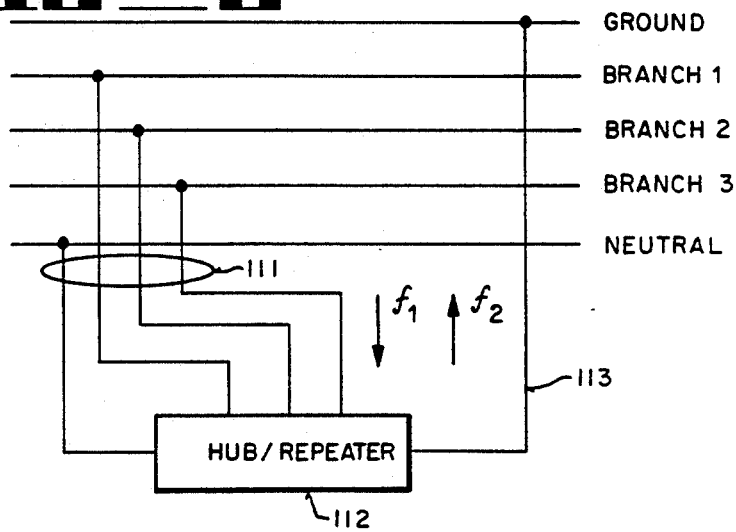

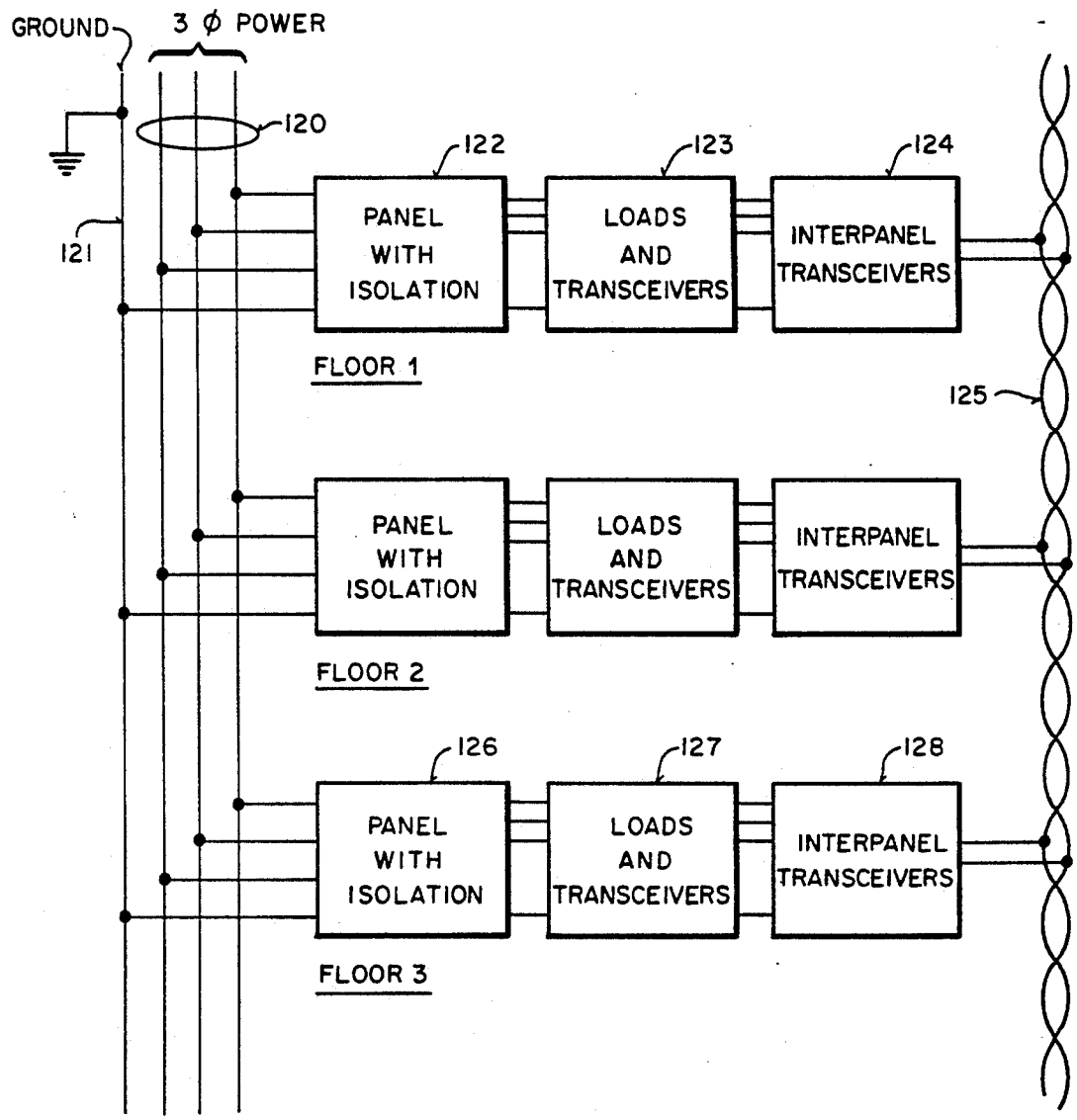
FIG _ 7

METHOD AND APPARATUS FOR POWER LINE COMMUNICATIONS

BACKGROUND OF THE INVENTION

1. Field of the Invention

The invention relates to the field of power line communications and, in particular, a method and apparatus that provides common mode transmission.

2. Prior Art

Numerous systems are known for providing communications over power lines. Typically, the communications are sent at a substantially higher carrier frequency (e.g. 50 kHz or higher) than is associated with alternating current power (e.g. 60 Hz). There are substantial high frequency noise and interfering signals such as harmonics of the power signal, switching transients, etc. that interfere with the power line communications. Numerous techniques are known for operating in a noisy environment for example, in some cases, the communications messages are repeated to assure transmission, spread spectrum signals are used in other cases, in addition to many other techniques. A system for providing sensing, communications and control over a variety of media, including power lines, is described in U.S. Pat. No. 4,918,690. Another system which utilizes power line communications is commercially available under the trademark "X10".

The present invention uses a common mode choke or inductor for presenting a high impedance to common mode power line communications. Common mode chokes are used in the prior art, however not for this application. They are used for example, to attenuate a common mode signal, such as the switching noise from a switching power supply.

As will be seen, the present invention provides a method and apparatus for better enabling power line communications. The differential mode noise which frequently troubles power line communications is described in conjunction with FIG. 1. The differential mode noise rejection and common mode transmission of the present invention is described in conjunction with the other figures.

SUMMARY OF THE INVENTION

The invention permits power line communications in an end user alternating current power distribution network, for example, in a home or business power distribution network having one or more power distribution lines (e.g., black coded line), a neutral line (white coded line) and a ground line (green coded or bare line). In such networks, the neutral line and ground line are both connected to an earth ground. The improvement of the present invention includes providing an inductor having two windings; one winding is coupled into the neutral line and the other into the power line (for a single power line network). The windings are wound such that the current delivering the power in the network produces cancelling magnetic fields in the inductor. Consequently, the inductor is substantially transparent to the power distributing current. With the present invention, power line communications use a common mode signal applied onto both the power line (or lines) and neutral line with the return path for the communications signals being provided by the ground line. The inductor presents a high impedance to this common mode signal, thereby preventing it from being directly connected ("shorted") to the ground line at the point where the neutral line and ground line are connected to one another.

In another embodiment, a repeater is used which receives the power line communications (e.g., in packets) at a first carrier frequency from one or more branches in the network and then repeats the communications at a second carrier frequency to all the branches in the network.

Other aspects of the present invention will be apparent from the following detailed description.

BRIEF DESCRIPTION OF THE DRAWINGS

FIG. 1 is an electrical diagram showing a portion of a power distribution network with power line communications as implemented in the prior art.

FIG. 2 is an electrical diagram showing a portion of a power distribution network with power line communications in accordance with the present invention. In FIG. 2 the single phase power distribution network includes a single power line and a neutral line in addition to a ground line.

FIG. 3 is an electrical diagram showing a portion of a power distribution system with power line communications in accordance with the present invention. In FIG. 3 the power distribution network includes two power lines and a neutral line in addition to the ground line.

FIG. 4 is a block diagram illustrating the coupling between a transceiver and a power distribution network in accordance with the present invention.

FIG. 5 illustrates a portion of a three phase power distribution network with power line communications in accordance with the present invention.

FIG. 6 illustrates the coupling of a repeater hub as taught by the present invention for a plurality of branches in a power distribution network.

FIG. 7 is an electrical diagram showing a portion of a power distribution network with power line communications in accordance with the present invention. In FIG. 7, 3 phase power is distributed through a plurality of panels or subpanels.

DETAILED DESCRIPTION OF THE PRESENT INVENTION

A power line communications apparatus and method is described which provides common mode rejection of noise signals. In the following description, numerous specific details are set forth, such as specific frequencies, in order to provide a thorough understanding of the present invention. It will be obvious to one skilled in the art that the present invention may be practiced without these specific details. In other instances, well known devices such as transceivers are not shown in detail in order not to unnecessarily obscure the present invention.

Prior Art

A typical alternating current end user power distribution network commonly used for 110 volt, 60 Hz power is shown in FIG. 1. Power is provided, for instance to a home, on two lines 10 and 11 from a utility company. These lines are ordinary aluminum or copper conductors. Line 10 may be a black coded wire and line 11—the neutral line—a white coded wire. At the service entrance the neutral line is connected to earth ground 14 by line 13. Also, a ground line 12 is connected to this ground. Power is then distributed to the home, business, or the like over lines 10 and 11 with line 12 providing a ground at each fixture and outlet. Loads are connected between the black and white lines for example, loads 16 and 17 are shown connected across these lines. Generally, while not shown, a main circuit breaker is used in addition to circuit breakers in each of the branches in this end user power distribution network.

In some cases a separate ground wire is not used to provide a ground connection. Rather, a ground path is obtained from a metallic conduit, or the like. Reference to a ground line in this application are intended to include such other ground paths.

Power line communications are used in these networks. Digital signals modulating a carrier having a frequency of 50 kHz or higher are transmitted by the transmitter 19 over the lines 10 and 11 and received by the receiver 20 over lines 10 and 11. The transmitter and receiver may also be coupled to ground as are the loads 16 and 17 for safety. A signal path for the information pass between the transmitter 11 and receiver 20 is shown by the arrows 22 and 23 which form a closed loop for signal current between the transmitter 19 and receiver 20.

The alternating current power delivered from a utility is not a pure sine wave. The power delivering current contains harmonics which can interfere with power line communications. Additionally there is noise from the loads (including switching transients). By way of illustration, if load 16 is a dimmer and light, the dimmer may "chop" the 60 Hz signal to reduce the power to the light. This introduces harmonics and noise into the lines 10 and 11. Other common loads such as motors introduce noise which can interfere with power line communications.

The power delivering current flowing to the load 16 is shown by the arrows 25 and 26. This current flows in a different direction in lines 10 and 11. This causes the noise introduced from load 16 to add to the signal being transmitted between the transmitter 19 and receiver 20 since the communications signals are sent in a differential mode over the lines 10 and 11. Obviously, this makes it more difficult to communicate effectively over power lines particularly since some of the harmonics and noise associated with the power distribution fall within the frequency range of the communications signals. That is, the noise is added to the communications signals since both the power and communications signals are transmitted in a differential mode over the same lines.

Single Phase, Two Line Embodiment of the Present Invention

Referring now to FIG. 2, an end user power distribution network is again shown comprising power line 30, neutral line 31 and a ground line or other grounding conductor 32. The neutral line 31 is again connected to earth ground 34 and line 32 by line 33. As was the case in FIG. 1, circuit breakers are not shown, nor are the various branches associated with the power distribution network. Loads 36 and 37 are shown connected between the power line 30 and neutral line 31.

Unlike FIG. 1, with the present invention, a transmitter, receiver or transceiver communicates in a loop which includes the black line and neutral line as a single path and then the ground line as the return path to complete the loop. For instance referring to FIG. 2 and power line communications transmitter 39, the output from transmitter 39 is applied between the lines 41 and the line 53. A common (that is, the same) signal is sent out on both lines 41. The same signal is thus applied to both lines 30 and 31 and coupled to the lines 42 of the receiver 40 over the path 44. The return path for the communications signal is along line 54 from the receiver 40, through the ground line 32 and then through line 53 of the transmitter 39 as shown by arrow 45.

Referring for a moment to FIG. 1, it should be noted that the white line and green line are connected together and hence it would appear that a signal applied between these line would be shorted out. This is indeed the case for FIG. 1. This however, does not happen with the present invention because of the inductor 46.

An inductor 46 having a first winding 47 and a second winding 48 is installed into the power distribution network. The first winding 47 is coupled into the black line, while the second winding 48 is coupled into the white line as shown. These windings are wound such that the magnetic field caused by the power delivering current in the windings cancel each other for normal power distribution. For example, assume current is flowing into the power distribution network in the direction indicated by arrow 56 on line 30. This necessitates that current will be flowing on the neutral line 31 in the opposite direction as indicated by arrow 57. The current flow in line 30 provides a magnetic field from the winding 47; this field is cancelled by the magnetic field caused by the current in winding 48. Consequently, the inductor 46 is essentially transparent to the power distribution system.

In practice, the inductor 46 should have sufficient magnetic core (iron) to prevent saturation for imbalances in current between the lines. The inductor 46 provides sufficient high frequency impedance to prevent the communications signal on the neutral line from being shorted to ground. For 200 ampere service, 20 turns per winding is sufficient with a total magnetic core weight of approximately 17 pounds. The inductor, in fact, may be realized by simply placing a plurality of toroids about the power conductors and neutral or by sliding the conductors, lines 10 and 11, through the toroids.

As mentioned when a signal is broadcast from the transmitter 39 on to lines 30 and 31, the inductance associated with a winding 48 is relatively large and hence prevents the signal from being shorted to ground through line 33. The impedance of the inductor winding 48 is relatively large since the frequency of the power line communications is relatively high (e.g. 100 kHz or above). Also the communication signals are transmitted (common mode) onto both lines 30 and 31 hence there is no cancellation of fields as there is for the power.

Accordingly, with the present invention, the transmitter 39 transmits communication signals equally on to both lines 30 and 31 and these signals are received from both the lines 30 and 31 at the receiver over lines 42. Note the signals on lines 30 and 31 are effectively added together thereby providing the common mode. This path as mentioned, is shown by arrow 44. The return path for signal currents from transmitter 39 is over line 32 shown by arrow 45. Importantly, this common mode transmission is substantially unaffected by the differential mode harmonics and noise on lines 30 and 31. Hence, the differential noise on the power lines associated with, for instance a dimmer, is not received by the receiver 40.

While in FIG. 2 a separate transmitter and receiver are shown, it will be appreciated that either of these devices may be transceivers that receive and transmit over the same lines. Thus for example, if transmitter 39 is a transceiver, it would receives and transmits common mode signals over lines 41. Again, the line 53 provides the return path through the ground.

Referring to FIG. 4, a transceiver 59 is illustrated with its coupling to lines 30, 31 and 32 of FIG. 2. Transceiver 59 may be any one of a plurality of power line communications transmitters/receivers. Lines 62 correspond to lines 41 or 42 of FIG. 2. These lines are coupled to one input/output terminal of the transceiver 59 through capacitors 60 and 61. As will be appreciated, these capacitors present substantially less impedance to the high frequency communication signals than they do to the relatively low frequency alternating current power. Hence, the communications signals may be transmitted and received by the transceiver 59 without providing a significant 60 Hz current path between lines 30 and 31. The other input/output terminal of the transceiver 59 is connected to the ground line as was the case with the transmitter 39 and receiver 40 of FIG. 2.

In one embodiment of the present invention the power line communications transmitters, receivers and transceivers, receive and transmit with the same carrier frequency. In an alternate embodiment, a repeater hub 51 (FIG. 2) is employed. This hub is connected to the lines 30 and 31 by the lines 52 and to the ground line by line 55. The hub 51 detects any communication transmissions and then repeats the transmissions back on to the lines 30 and 31. Importantly, the hub receives transmissions on one carrier frequency and then broadcasts them on a second carrier frequency. For example, the transmitter 39 transmits a message using a 150 kHz carrier which message when received by the hub 51 is retransmitted using a 100 kHz carrier. The hub will be discussed in greater detail in conjunction with FIG. 5.

Three Wire Embodiment of FIG. 3

FIG. 3 illustrates an embodiment of the present invention where power is distributed on three wires—power lines 66 and 68 and the neutral line 67. This is a typical single phase 100-220 volt power distribution system very common in the United States. 110 volts exists between lines 66 and 67 and between lines 67 and 68. 220 volt loads are placed directly across lines 66 and 68 as indicated by load 80. Once again, the neutral is connected to earth ground and a separate ground line 69 (or other grounding conductor) is used.

As with the embodiment of FIG. 1, an inductor 70 is coupled into the power carrying lines and neutral line. The inductor comprises three windings 71, 72 and 73. These windings are wound on a common core such that there is no net magnetic field caused by power distribution as with the case of FIG. 1. Note that for the current flowing through windings 71 and 73 for load 80 there is no net magnet field and thus no impedance is presented by the inductor 70 to the 60 Hz current. Once again toroids may be placed about these conductors as a method to obtain inductance.

In the embodiment of FIG. 3, a plurality of branch lines are shown, for instance, branch lines 66a and 66b are shown coupled to the winding 71 with each branch line being protected by a circuit breaker. Specifically, circuit breaker 74 protects line 66a while circuit breaker 75 protects line 66b. Similarly, there is circuit breaker 76 shown protecting line 68a. Typical loads are shown such as 110 volt load 78 is connected between lines 66b and 67 and load 79 is connected between lines 68a and 67.

A transmitter or transceiver 82 for power line communications is shown connected to the branch line 66a and the neutral line. As with the embodiment of FIG. 2, a signal is transmitted on to both of these lines with the return path for this signal being the ground line 69. Another transmitter or transceiver 83 is coupled to lines 66b and 68a and again with the return path coupled to the ground line. The transceiver 83 couples a signal on to both lines 66b and 68a and can receive a signal from both of these lines. Similarly, the receiver 84 is shown coupled to the lines 66b and 68a and receives a common mode signal from these lines, the receiver's other input terminal is coupled to line 69. Another transceiver 85 provides a signal on the lines 67 and 68a again with its other terminal coupled to the ground line 69.

In all cases, the power line communications signals provided by the transceivers and transmitters is blocked by the inductor 70 and therefore is not shorted to the ground line. And in each case communications occur by using the ground line as a link in the communications circuit in addition to its ordinary role as a safety line. Note the ground remains a ground line for safety reasons with the present invention.

For the network of FIG. 3 the repeater hub such as hub 51 of FIG. 2 is not shown. Note the hub is not needed to gain the advantage of rejecting the differential noise. The hub, rather, is optional in all the illustrated embodiments.

In the above embodiments, the transmitters/receivers/transceivers have one terminal coupled to at least one power carrying line and neutral line, and the other terminal to the ground line. For the two power line embodiment of FIG. 3, one terminal may be coupled to both power carrying lines and the neutral line. Also, some advantage over the prior art can be gained by transmitting with one terminal coupled to either a power carrying line or the neutral line and the other terminal to ground line.

Three Phase Embodiment of FIG. 5

In FIG. 5, a three phase power system is represented to the left of the dotted line 85 by the Y configuration 86. The common point of this configuration is coupled to earth ground and to a neutral line. A local power distribution system is shown to the right of the dotted line 85. Circuit breakers and branch lines typically used are not illustrated. The three current carrying power lines in the three phase system, lines 93, 94 and 95 are each coupled through a winding in an inductor, specifically windings 87, 88 and 89, respectively. The neutral line 110 is also coupled to a winding 91. These windings are wound about a common core 90. As with the previous embodiments, when power is delivered through these lines, there is a cancellation of the magnetic fields in the inductor. For example, consider load 96 which is coupled between the lines 93 and 94, the magnetic field produced by winding 87 is cancelled by the field from winding 88 when power is delivered to the load 96. The same is true for the load 97 which is illustrated coupled to the three power phases such as would be the case with a three phase motor. Similarly, load 110 is coupled between line 94 and the neutral line 110. Not illustrated is the coupling of the loads to the "safety" ground line 92. (In different networks, loads may only be coupled to the three phase power lines (no neutral) or other combination of power lines (with or without neutral line) may be used).

Power line communications for the distribution network of FIG. 5 is again used using the common mode technique previously described. For instance, a transceiver 98 broadcasts and receives signals on to both lines 94 and 110 with a return path being provided on the ground line 92. Thus, the lines 100 associated with the input/output of the transceiver 98 as in the early embodiments apply the same signal to both lines 94 and 110. This signal is coupled by the transceiver between the lines 100 and 101. Similarly, a receiver 99 is shown receiving signals between lines 102 and line 103. The transceivers, transmitters and/or receivers may be coupled between the ground line and one or more of the power carrying lines and neutral line (if present). As in the prior embodiments, the inductor presents a high impedance to the communications signal preventing the power line communications from being coupled to ground while being substantially transparent to the power delivering current. Moreover, as is true with the other embodiments, the inductor blocks communications signals from the power line. By way of illustration, communications signals from a neighboring factory are blocked by the inductor.

The inductor of FIG. 5 with the common mode transmission may be used with or without the hub repeater previously discussed. In FIG. 5, the hub repeater is shown including a driver/receiver 106, digital storage 109 and oscillators 107 and 108. The hub repeater can be implemented in two ways: (i) it can receive and transmit at the same frequency, or (ii) it can receive and transmit at different frequencies. If one frequency is used, storage is provided to store an entire received message before it is transmitted to prevent a collision.

The driver/receiver 106 may be an ordinary driver/receiver which receives a signal between lines 104 and 105 and which also transmits signals between lines 104 and 105. Line 104 is coupled to the power lines 93, 94 and 95, and neutral line 110 through capacitors, while the line 105 is connected directly to the ground line 92. The driver/receiver 106 is coupled to receive both the 150 kHz signal from oscillator 107 and the 100 kHz from the oscillator 108. The driver/receiver 106 detects 150 kHz signals between lines 104 and 105 and upon receiving such signals communicates them at the data rate of the 150 kHz carrier to the storage means 109. The storage means 109 may be an ordinary digital buffer which receives and stores digital messages. Once the storage means 109 receives an entire message, it transmits the message back to the driver/receiver 106 and the message is broadcast onto the power lines by coupling the message between lines 104 and 105. This broadcasting is done with the 100 kHz carrier under control of the oscillator 108. (Note where different frequency carriers are used as illustrated, the storage 109 is not needed since receiving and transmission can occur at the same time with a common bit rate. Where one frequency is used for transmission and receiving storage 109 is used as described). Note that with the hub repeater of FIG. 5, an incoming communications on, for instance, lines 93 and 94 is transmitted back onto all three power lines and neutral line. Alternatively, where the hub/repeater is not used, each of the power lines and neutral line may be interconnected by capacitors to allow power line communication signals broadcast on one or more of the power lines to be present on all the power lines.

Hub/Repeater Connection

Referring to FIG. 6, a hub/repeater 112 which may be similar to the hub/repeater shown in FIG. 5 is illustrated coupled to receive and transmit signals on to a plurality of branch lines and neutral lines. In a typical application such as in a home, the hub/repeater 112 is coupled to each of the branch lines, neutral line and ground line. A power line communication device transmits a signal on to branch 1 and the neutral line (again the return path through is the ground line) this signal is received by the hub/repeater on the carrier frequency f1. The hub/repeater then retransmits the signal between lines 111 and 113, that is, the communication received from one branch line is transmitted on to all the branch lines on the carrier frequency f2. This assures that communications devices on any of the branches communicate with one another. As mentioned when different carrier frequencies are used, no storage is needed in the hub and the receiving and transmitting bit rate is equal.

Embodiment of FIG. 7

FIG. 7 illustrates a three phase power distribution system where a central panel (not illustrated) receives power from a utility and then the power is distributed to different floors in a building. Each floor has another panel or subpanel with circuit breakers to protect the branch wiring on that floor.

Referring more specifically to FIG. 7, the three phase power is distributed over lines 120 to floor 1, floor 2 and floor 3. (Neutral line is not illustrated. The ground line 121 is also coupled to each of the floors. With the present invention, each of the panels on each floor includes an inductor for providing isolation for that floor such as the inductor shown in FIG. 5. Thus, panel 122 and the other panels with isolation include such an inductor. For floor 1, the loads and transceivers are simply illustrated as a block 123. These loads correspond, by way of illustration, to the loads 96 and 97 of FIG. 5. Therefore, the transceivers illustrated by block 123 may communicate among themselves on floor 1 with the inductor in the panel 122 preventing the communications signals from appearing on the main power lines 120. The inductors, in addition to preventing the shorting of the communications signals to the ground line 121, prevents the communications signals on the different floors from interfering with one another over the power lines 120 and ground line 121. As was the case with the embodiment of FIG. 5, the intra-floor communications are of the common mode type, that is, they are sent out and received between the power lines and ground line.

In some cases inter-floor communications are necessary. For the embodiment of FIG. 7 a separate inter-floor link is used with the communications being transmitted over a twisted pair, lines 125. Each floor is coupled to these lines through an inter-panel transceiver such as inter-panel transceiver 124. Each of these transceivers is coupled to the power lines and ground line for its respective floor and receives communications from that floor. These communications can then be transmitted over the lines 125 to another floor. The inter-panel transceiver 124 may be programmed to examine all messages on its respective floor and to select only those messages intended for other floors. Similarly, each of the transceivers 124 can be programmed to recognize messages for its floor on lines 125 and to then receive these messages and couple them between the power lines and ground line. Moreover, the inter-panel transceivers may receive and transmit signals on to the power line at a lower frequency than they receive or transmit communications on to the lines 125. Typically, the lines 125 have a broader bandwidth than the power lines.

In use, assume that on floor 3, the panel with isolation 126 again includes an inductor and that the equipment on this floor comprises the loads and transceivers 127. If it becomes necessary to control a load on floor 3 from floor 1, the inter-panel transceiver 124 recognizes a message as one designated for floor 3, transmits this message over lines 125 and the inter-panel transceiver 128 picks up this message and transmits it between the power lines and ground line of floor 3. There the message is received by the transceiver associated with the load to control the load.

It should be noted in FIG. 7, in contrast to the other embodiments, that the common mode isolation provided by the inductors is not centrally located, but rather placed at different locations within a network. While the example of FIG. 7 describes floors in a building, the concept of course would apply where a plurality of panels are: on a single floor, in different buildings, etc.

Thus, a method and apparatus for power line communications has been described which provides common mode transmission of signals onto power lines thereby substantially diminishing the effects of differential mode loading and noise.

We claim:

1. In a power distribution system having a plurality of power distribution panels connected to receive power from a common power source, each of said panels being connected to supply power to a corresponding power distribution network, a communications apparatus comprising:

a plurality of inductors, at least two for each of said panels, said inductors being coupled to power lines for isolating high frequency communications signals in each of said networks from said common power source;

a plurality of first transceivers, one for each of said networks, each of said first transceivers being coupled to its respective network so as to receive and transmit communications signals onto its network;

a communication link coupled to each of said first transceivers for allowing communication signals from one of said networks to be communicated through its respective first transceiver to another of said networks via said link and said other networks first transceiver; and a plurality of second transceivers, one for each of said networks, each of said second transceivers for communicating signals within each of said networks and with each of said first transceivers, each of said first and second transceivers being connected so as to transmit communications signals in a common mode in said networks.

2. The apparatus defined by claim 1 wherein each of said first transceivers selects only communication signals from its respective network that are 3. The apparatus defined by claim 1 wherein each of said first transceivers selects from said link only communication signals intended for its respective network.

4. The apparatus defined by claim 1 wherein said link comprises a twisted pair.

* * * * *

UNITED STATES PATENT AND TRADEMARK OFFICE
CERTIFICATE OF CORRECTION

PATENT NO. : 5,257,006
DATED : October 26, 1993
INVENTOR(S) : Martin H. Graham, et. al.

It is certified that error appears in the above-indentified patent and that said Letters Patent is hereby corrected as shown below:

Column 8, line 32, after the word "illustrated" insert --)--.

Column 10, Claim 2, line 3, after the word "are" insert --intended to be transmitted over said link--.

Signed and Sealed this

Twenty-sixth Day of April, 1994

Attest:

BRUCE LEHMAN

*Attesting Officer*     *Commissioner of Patents and Trademarks*